United States Patent [19]

Kimura et al.

[11] Patent Number: 4,690,123

[45] Date of Patent: Sep. 1, 1987

[54] CONTROL OF IGNITION TIMING UPON OCCURRENCE OF ABNORMALITY IN A REFERENCE CRANK ANGLE POSITION SENSING SYSTEM

[75] Inventors: Shigehiro Kimura, Niiza; Takashi Ono, Wakoh; Nobuyuki Narisawa, Toshima, all of Japan

[73] Assignee: Honda Giken Kogyo Kabushiki Kaisha, Tokyo, Japan

[21] Appl. No.: 865,523

[22] Filed: May 21, 1986

[30] Foreign Application Priority Data

May 27, 1985 [JP] Japan ............................... 60-113757

[51] Int. Cl.$^4$ .............................................. F02P 9/00
[52] U.S. Cl. .................................... 123/612; 123/414; 123/609
[58] Field of Search ............... 123/414, 612, 613, 617, 123/146.5 A, 476, 477, 479, 609

[56] References Cited

U.S. PATENT DOCUMENTS

| 4,265,211 | 5/1981 | Meloeny ............................... 123/609 |
| 4,457,286 | 7/1984 | Katayama et al. .................... 123/612 |
| 4,485,784 | 12/1984 | Fujii et al. ............................ 123/414 |
| 4,494,518 | 1/1985 | Katayama et al. .................... 123/414 |

Primary Examiner—Andrew M. Dolinar
Attorney, Agent, or Firm—Lyon & Lyon

[57] ABSTRACT

A method of controlling ignition timing of an internal combustion engine when an abnormality develops in a system for sensing a reference crank angle position of a crankshaft of the engine, in which the timing at which an ignition coil starts and stops conducting is controlled on the basis of a first pulse signal generated once per at least two revolutions of the crankshaft at a predetermined crank angle position associated with a particular cylinder of the engine, a second pulse signal indicative of a predetermined reference crank angle position of the crankshaft for each cylinder, and a third pulse signal indicative of a predetermined angular position of the crankshaft. The method comprises the steps of sensing an abnormality in the reference crank angle position sensing system for sensing the predetermined reference crank angle position, generating a pseudo-signal pulse having a predetermined pulse width in place of the second pulse signal on the basis of the first and third pulse signals when the second pulse signal fails to be generated because of the abnormality in the reference crank angle position sensing system, starting conduction of the ignition coil at a leading edge of the pseudo-signal pulse, and stopping conduction of the ignition coil at a trailing edge of the pseudo-signal pulse.

2 Claims, 4 Drawing Figures

4,690,123

CONTROL OF IGNITION TIMING UPON OCCURRENCE OF ABNORMALITY IN A REFERENCE CRANK ANGLE POSITION SENSING SYSTEM

BACKGROUND OF THE INVENTION

This invention relates to a method of controlling ignition timing when a fault develops in a system for sensing a reference crank angle position of a crankshaft in an internal combustion engine.

In an ignition timing control method for an internal combustion engine, e.g. an internal combustion engine having four cylinders, an electronic control unit receives, as input signals, a cylinder discriminating signal generated at a particular crank angle position of a particular cylinder whenever the crankshaft makes two full revolutions, a top dead center (TDC) signal indicative of a predetermined reference crank angle position for each cylinder, e.g. a predetermined crank angle position before TDC at the end of a compression stroke, and a crank angle position signal, which is generated whenever the crankshaft rotates through a predetermined angle, to give an indication of the crank angle position. Using these input signals, the electronic control unit discriminates a particular cylinder on the basis of the cylinder discriminating signal, sets an optimum ignition timing for each cylinder in dependence upon the engine operating condition, and controls the timing at which an ignition coil starts and stops conducting in accordance with the TDC signal and crank angle position signal so as to attain the optimum ignition timing.

The TDC signal plays a particularly important role as a reference signal when an ignition advance angle is decided upon. However, the TDC signal is likely to be lost if a fault such as the breakage of a wire should occur in the reference crank angle position sensing system, which includes a sensor for sensing the reference crank angle position. If such a situation occurs, the reference crank angle position can no longer be sensed accurately, thus making it difficult to achieve proper ignition timing control of the engine.

SUMMARY OF THE INVENTION

It is therefore an object of the invention to provide an ignition timing control method for an internal combustion engine, which method makes it possible to control the ignition timing of the engine and continue engine operation even if the reference crank angle position sensing system develops an abnormality.

According to the present invention, the foregoing object is attained by providing a method of controlling ignition timing when an abnormality develops in a system for sensing a reference crank angle position of a crankshaft of an internal combustion engine, in which the timing at which an ignition coil starts and stops conducting is controlled on the basis of a first pulse signal generated once per at least two revolutions of the crankshaft at a predetermined crank angle position associated with a particular cylinder of the engine, a second pulse signal indicative of a predetermined reference crank angle position of the crankshaft for each cylinder, and a third pulse signal indicative of predetermined angular positions of the crankshaft, the method being characterized by comprising the steps of sensing an abnormality in the reference crank angle position sensing system for sensing the predetermined reference crank angle position; generating a pseudo-signal pulse having a predetermined pulse width in place of the second pulse signal on the basis of the first and third pulse signals when the second pulse signal fails to be generated as a result of the abnormality in the reference crank angle position sensing system; starting conduction of the ignition coil at a leading edge of the pseudo-signal pulse; and stopping conduction of the ignition coil at a trailing edge of the pseudo-signal pulse.

Thus, according to the present invention, ignition timing can be controlled and engine operation continued even if the second pulse signal fails to be generated due to a fault in the reference crank angle position sensing system.

The above and other objects, features and advantages of the invention will be apparent from the following description taken in conjunction with the accompanying drawings, in which like reference characters designate the same or similar elements or parts throughout the figures thereof.

DETAILED DESCRIPTION

A preferred embodiment of an ignition timing control method for an internal combustion engine according to the invention will now be described with reference to FIGS. 1 through 4.

Figure 1:
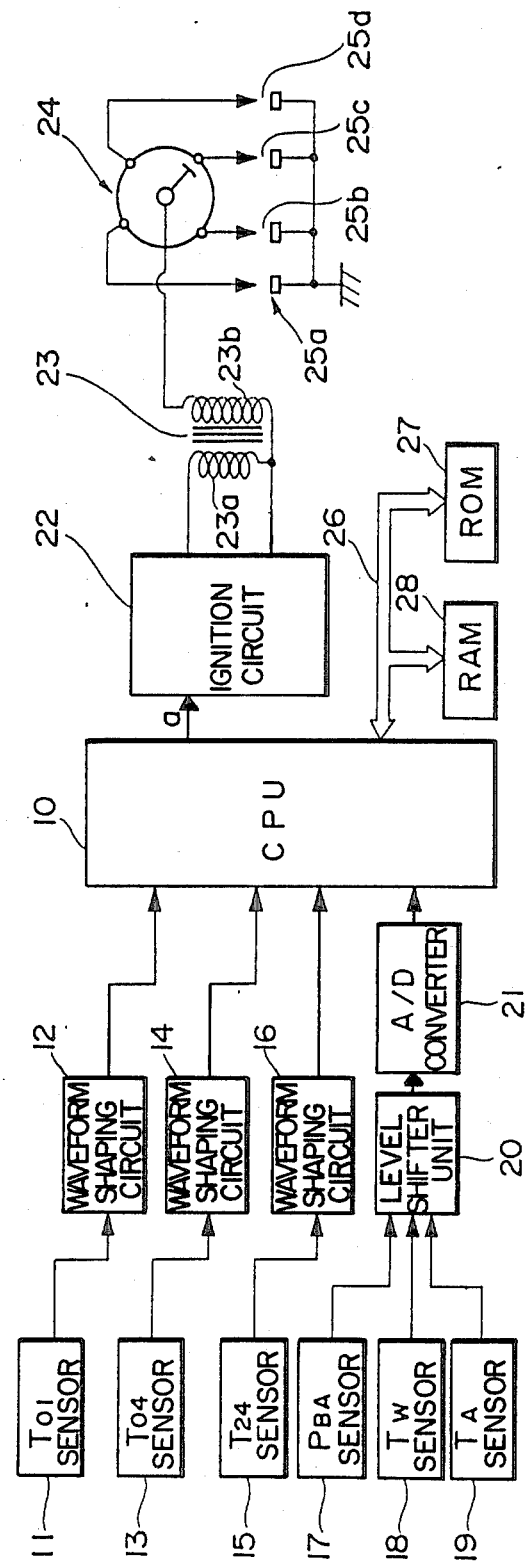
FIG. 1 is a block diagram illustrating the overall construction of an ignition timing control system for practicing the method of the present invention.

FIG. 1 illustrates the overall construction of an ignition timing control system for practicing the method of the invention. The illustrated ignition timing control system is for controlling the ignition timing of, e.g. a four-cylinder internal combustion engine, not shown, and includes a central processing unit (hereafter referred to as "CPU") 10 having an input side to which sensors for sensing various parameters are connected. These sensors include a T01 sensor 11, a T04 sensor 13 and a T24 sensor 15, which are connected to the CPU 10 via waveform shaping circuits 12, 14 and 16, respectively, as well as a PBA sensor 17 for sensing absolute pressure (PBA) in an intake pipe downstream of the engine throttle valve, a TW sensor 18 for sensing engine coolant temperature (TW), and a TA sensor 19 for sensing intake air temperature (TA). These sensors 17, 18, 19 are connected to the CPU 10 via a level shifter unit 20 and an A/D converter 21.

The T01 sensor is arranged in facing relation, for example, to an engine camshaft, not shown, for generating a cylinder discriminating signal T01 as a single first pulse signal once per two full revolutions of the engine crankshaft (not shown), namely at a predetermined crank angle position before top dead center (TDC) at the end of a compression stroke of a particular cylinder (e.g. the first cylinder in the illustrated embodiment). The T01 signal pulse is shaped into rectangular pulse, shown at (a) of FIG. 2, by the waveform shaping circuit 12 before being fed into the CPU 10.

The T04 sensor 13 also is arranged in facing relation to the engine camshaft and generates a reference crank angle position signal T04 as a second pulse signal, which is indicative of a reference crank angle position of each cylinder, at a predetermined crank angle position (e.g. 10° BTDC) before the top dead center (TDC) position at the end of the compression stroke of each cylinder. The T04 signal pulse is shaped into rectangular pulse, shown at (b) of FIG. 2 and (a) of FIG. 3, by the waveform shaping circuit 14 before being fed into the CPU 10.

The T24 sensor 15 which, like the T04 sensor 13, is arranged in facing relation to the camshaft, senses the crank angle position of the crankshaft and generates a crank angle position signal T24 as a third pulse signal whenever the crankshaft rotates through a predetermined angle (e.g. 30°). The T24 signal pulse is shaped into rectangular pulse, shown at (c) of FIG. 2 and (b) of FIG. 3, by the waveform shaping circuit 16 before being fed into the CPU 10. A pseudo-reference position signal T04' shown at (e) of FIG. 2 constitutes a characterizing feature of the invention and will be described in detail below.

Connected to the output side of the CPU 10 is an ignition circuit 22 for supplying a primary coil 23a of an ignition coil 23 with coil excitation power. The ignition coil 23 has a secondary coil 23b connected to spark plugs 25a–25d of respective cylinders via a distributor 24.

Also connected to the CPU 10 via a bus 26 are a ROM 27 storing an operational program, etc., and a RAM 28 for temporarily storing the results of calculations executed by the CPU 10 in accordance with the operational program, as well as other data.

Figure 2:
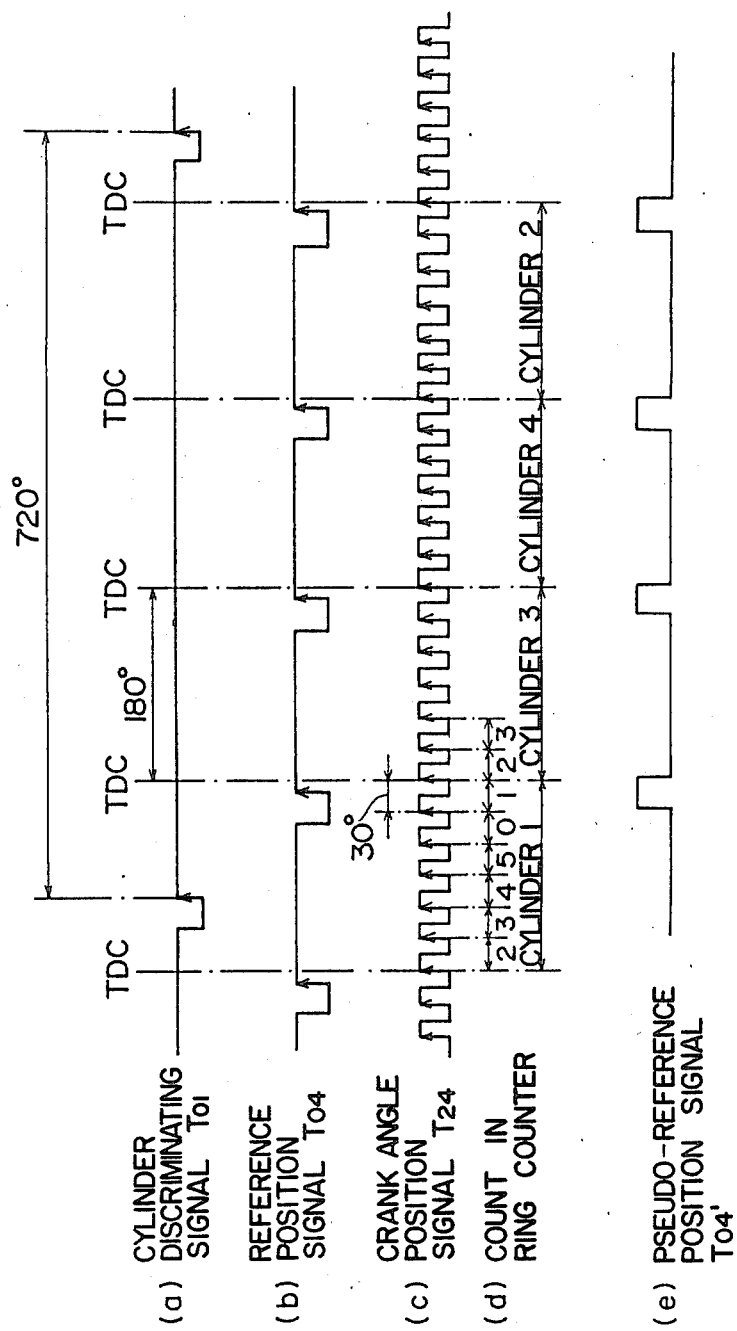
FIG. 2 is a timing chart illustrating the timing at which such signals as a reference crank angle position signal are generated.
Figure 3:
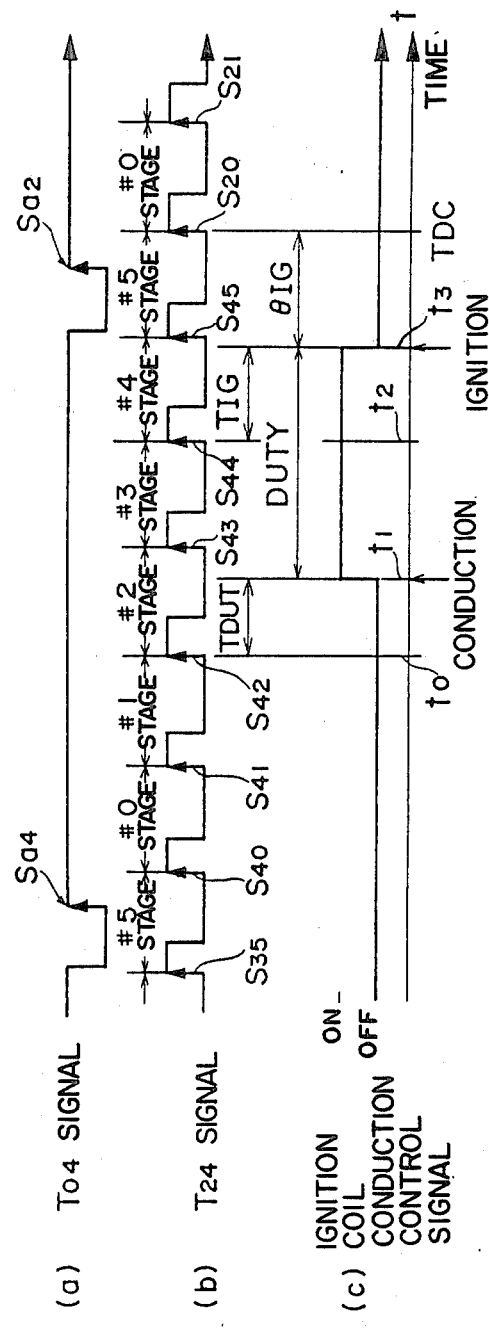
FIG. 3 is a timing chart for describing ignition timing control when a reference crank angle position sensing system is operating normally.
Figure 4:
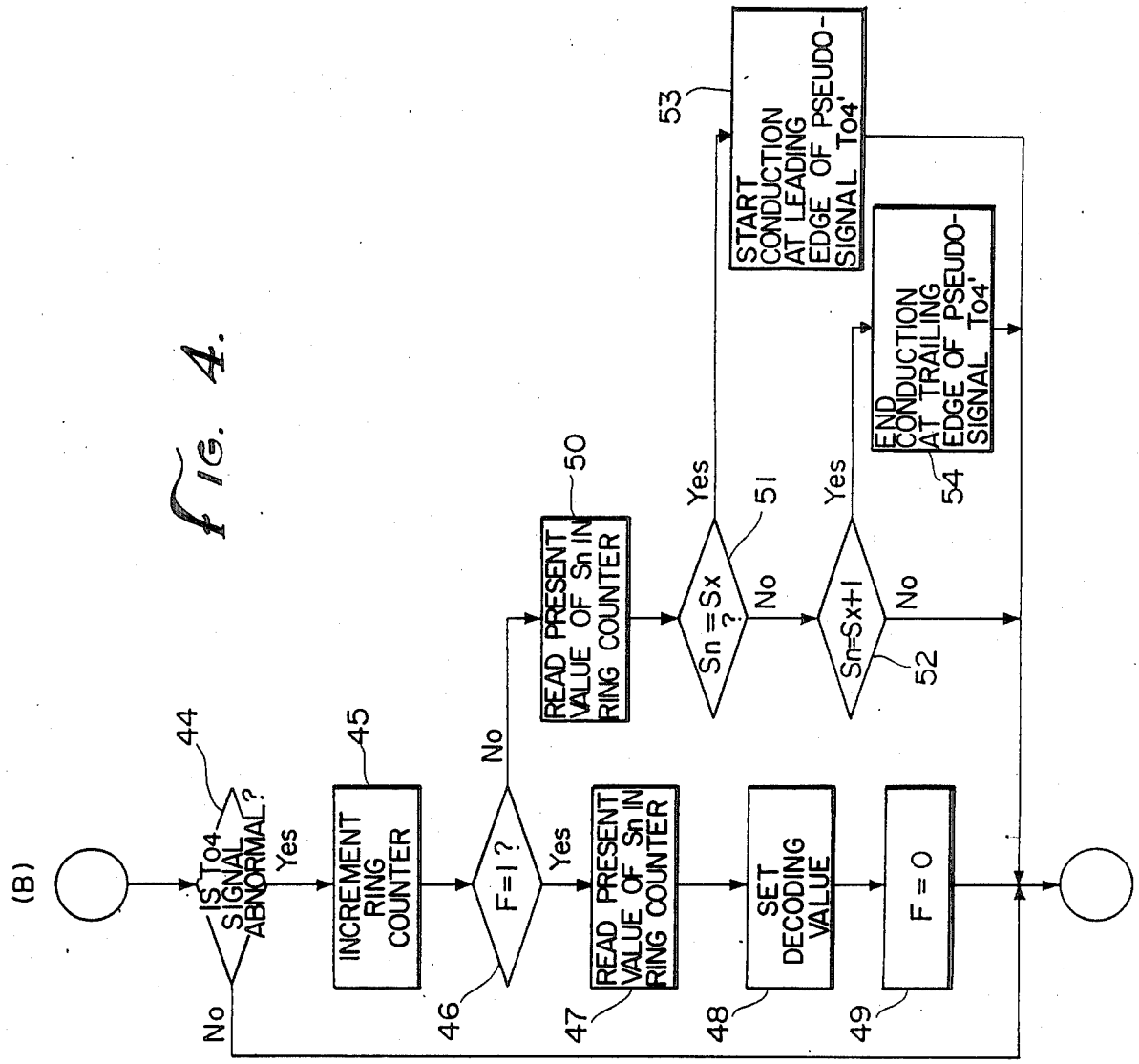
FIG. 4 shows flowcharts illustrating, in accordance with the method of the present invention, a manner of controlling ignition timing when an abnormality develops in the reference crank angle position sensing system.
Figure 4:
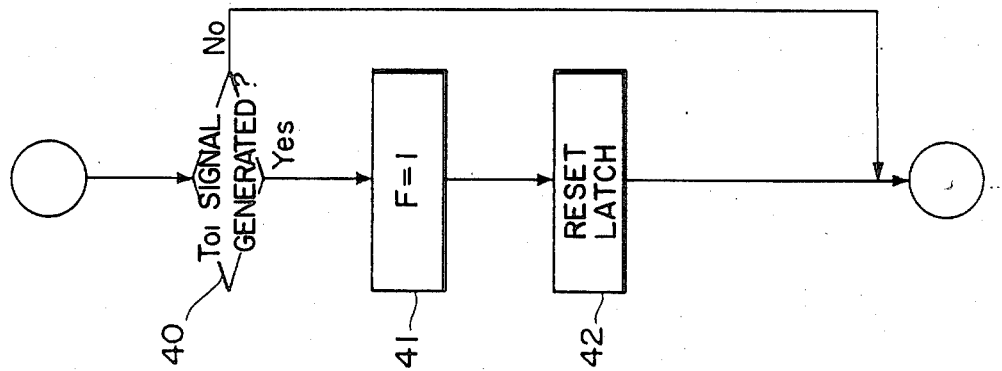

Reference is now made to FIGS. 2 through 4 to describe the operation of the ignition timing control system constructed as set forth above. FIG. 3 illustrates ignition timing control when the reference crank angle position sensing system (hereafter referred to as a "TDC sensor system") is operating normally, and FIG. 2 illustrates ignition timing control when the TDC sensor system is operating abnormally.

The ignition control when the TDC sensor system is operating normally will be described first. In FIG. 3, the term "stage" refers to the interval between the leading edge of each pulse of the T24 signal and the leading edge of the next pulse of this signal. These stages are numbered consecutively from 0 to 5 starting from the first stage.

The CPU 10 senses the T01 signal and, on the basis of the T04 and T24 signals, successively senses stage positions between the reference crank angle position of each cylinder of the engine and the reference crank angle position of the next cylinder within which spark ignition should be effected. When a predetermined stage position (e.g. a #0 stage) is sensed, the CPU 10 performs computations based on the output signals from the above-mentioned parameter sensors to determine an ignition timing or ignition advance angle θIG, an ignition coil conduction time DUTY and other required quantities. The ignition advance angle θIG is computed by the use of the following equation:

$$\theta IG = \theta MAP + \theta IGCR$$

The ignition advance angle θIG is expressed in terms of the crank angle before a crank angle position, e.g., TDC position, at which a T24 signal pulse, e.g. S20 in (b) of FIG. 3 is generated immediately after a T04 signal pulse, e.g. Sa2 [(a) of FIG. 2] indicative of the reference crank angle position of a cylinder, e.g. the second cylinder, within which ignition should be effected. θMAP represents a basic ignition timing or ignition advance angle read out of a map, which is stored in the ROM 27, from a location designated by engine rotational speed (rpm) Ne and absolute pressure PBA within the intake pipe, with PBA being representative of the engine load. θIGCR represents an advance/delay angle correction amount read out of a table, which is stored in the ROM 27, in dependence upon such factors as the engine coolant temperature TW and intake air temperature TA. The rotational speed Ne is calculated as the reciprocal of a value Me, which is obtained by counting the pulse generation interval of the T24 signal pulses by using clock pulses having a predetermined period.

The conduction time DUTY is a function of the engine rotational speed Ne and is read out of a table stored in the ROM 27, as set forth above. The value read out of the table is corrected by the battery voltage supplied to the ignition coil before being applied for use.

Next, the CPU 10 computes the conduction initiation timing TDUT and conduction termination timing TIG of the primary coil 23a based on the ignition advance angle θIG and conduction time DUTY found in the manner set forth above. To accomplish this, the CPU 10 first counts back, from a TDC position immediately after the reference crank angle position of the second cylinder within which ignition should be effected, a crank angle position [a position corresponding to instant t1 in FIG. 3(c)] at which conduction of the primary coil 23a is to start based on the ignition advance angle θIG and conduction time DUTY, and determines in which stage position is located the crank angle position at which conduction is to start. The CPU 10 then finds the period of time needed for this crank angle position to be attained by rotation of the crankshaft from instant t0 [(c) of FIG. 3], which is that at which the T24 signal pulse in the determined stage position (the #2 stage position in the illustrated embodiment) enters the CPU 10. This period of time is the conduction initiation timing TDUT. Likewise, the CPU 10 determines in which stage position is located the crank angle position [a position corresponding to the instant t3 in (c) of FIG. 3] at which conduction of the primary coil 23a is to be terminated based on the ignition angle θIG. The CPU 10 then finds the period of time needed for this crank angle position to be attained by rotation of the crankshaft from instant t2, which is that at which the T24 signal pulse in the determined stage position (the #4 stage position in the illustrated embodiment) enters the CPU 10. This period of time is the conduction termination timing TIG.

The CPU 10 has internal counters (not shown) used in the process for initiating and terminating conduction of the primary coil 23a. Using the conduction initiating counter, the CPU 10 waits for the elapse of the conduction ignition time period TDUT extending from detection (instant t0) of the T24 signal pulse (S42) of the stage position at which conduction of the primary coil 23a is to start is detected, and applies a conduction control signal a to the ignition circuit 22 at the instant (t1) the period of time TDUT expires. Then, using the conduction terminating counter, the CPU 10 waits for the lapse of the conduction termination time period TIG extending from detection (instant t2) of the T24 signal pulse (S44) of the stage position at which conduction of the primary coil 23a is to stop, and removes the conduction control signal a from the ignition circuit 22 at the instant (t3) the period of time TIG expires.

The ignition circuit 22 supplies the primary coil 23a of ignition coil 23 with coil excitation power for the period of time during which the CPU 10 supplies the ignition circuit 20 with the conduction control signal a. When supply of the coil excitation power is cut off from the ignition circuit 22, a high voltage is produced in the secondary coil 23b of ignition coil 23 and is supplied to a spark plug (spark plug 25c in the illustrated embodiment) by the distributor 24, thereby igniting the spark plug by causing it to produce a spark discharge.

Ignition timing control will now be described with reference to FIGS. 2 through 4 for a case where there is an abnormality in which the T04 signal input is absent because of a failure such as a broken wire in the TDC sensor system.

FIG. 4 shows flowcharts illustrating a manner of generating the aforementioned pseudo-reference position signal T04' depicted in (e) of FIG. 2.

A flowchart illustrated in (B) of FIG. 4 is executed whenever the crank angle position signal pulse T24 is generated, and a flowchart shown in (A) of FIG. 4 is executed at least once in synchronism with the T24 signal or a clock pulse signal of a predetermined period before the flowchart of (B) of FIG. 4 is executed.

In (A) of FIG. 4, a first step 40 calls for a determination as to whether the cylinder discriminating signal T01 has been generated. The determination is made by placing latch means (not shown) in a predetermined state or output level when the T01 signal is generated, and then sensing the predetermined state. If the answer to the step 40 is NO, the present program is ended without steps 41, 42 being executed. If a YES answer is obtained at the step 40, a flag F is set to logical "1" at the step 41 and the latch means is reset at the step 42, after which the present program is ended.

In (B) of FIG. 4, a first step 44 calls for a determination, which is made when the T24 signal is generated, as to whether the TDC sensor system has been determined to be abnormal. The determination as to abnormality of the TDC sensor system is executed in accordance with a T04 signal abnormality-determining subroutine, not shown. Whether the TDC sensor system is normal or not is determined in dependence on whether the T04 signal input from the T04 sensor 13 is present; absence of the T04 signal means that the system is abnormal. As described later, in the present embodiment, in the event of abnormality in the TDC sensor system, conduction of the ignition coil is started at 30° before TDC, and termination of the coil conduction or spark ignition is effected at TDC. If the decision rendered at the step 44 is negative, the present program is ended and ignition timing control is performed as described earlier for normal operation of the TDC sensor system. When the TDC sensor system is faulty as indicated by loss of the T04 signal input, the answer obtained at the step 44 is YES and the program proceeds to a step 45, at which a count Sn in a ring counter (not shown) is incremented by 1. This is followed by a step 46, at which the CPU 10 determines whether the status of the flag F is "1". Since the flag F is set to "1" whenever a T01 signal pulse is generated, as mentioned above, the answer to the step 46 is YES, and the program proceeds to a step 47, if the T24 signal pulse is one generated immediately after the generation of the signal pulse T04.

The step 47 calls for the CPU 10 to read the prevailing count Sn from the ring counter. In the embodiment of FIG. 2, the prevailing count Sn in the ring counter is 5. Next, at a step 48, the CPU 10 adds a predetermined value So (e.g. 2) to the present count Sn to set a decoding value Sx. If, as a result of adding the predetermined value So to the numerical value Sn, the sum exceeds a value of 5, Sx is set to a value obtained by subtracting a value of 6 from the sum. Accordingly, since Sn=5, So=2 in the present case, the decoding value Sx is set to 1. Next, the flag F is reset at a step 49, after which the present program is ended.

Next, when the T24 signal is sensed again, the count Sn in the ring counter is incremented by 1 at the step 45 and the program then proceeds to the step 46. Now, since the flag has been reset, the answer to the step 46 is NO and the program proceeds to a step 50, at which the currently prevailing count Sn in the ring counter is read. Next, at a step 51, the CPU 10 determines whether the count Sn just read and the decoding value Sx agree. Since the present value of the count Sn is 0, the answer to the step 51 is NO. A NO answer is also obtained at a decision step 52, described below, and the present program is ended.

The determination made at the step 51 is executed repeatedly each time a T24 signal pulse is generated until the prevailing count Sn in the ring counter comes into agreement with the decoding value Sx. When this agreement is established [namely when the condition Sn=1 is established in the embodiment of (d) of FIG. 2 since the decoding value Sx has been set to 1 as noted before], the program proceeds to a step 53, at which the pseudo-signal T04' is raised to a high logic level [(e) of FIG. 2] and the current starts to be fed into the ignition coil 23 at the leading edge of this signal, namely at a crank angle position which is 30° before TDC. Execution of the present program is then ended.

Next, when the T24 signal is sensed again, the count Sn in the ring counter is incremented by 1 at the step 45, whereupon the determination of the step 51 is performed following execution of the steps 46 and 50. Since the count Sn in the ring counter will now have a value of 2, a negative decision is rendered at the step 51 and the program proceeds to the step 52. Here the CPU 10 determines whether a value Sx+1, obtained by adding 1 to the decoding value Sx, agrees with the count Sn now present in the ring counter. In the present loop of execution, Sx+1=2, Sn=2 holds. Therefore, the answer to the step 52 is YES and the program proceeds to a step 54, at which the pseudo-signal T04' is sent to a low logic level [(e) of FIG. 2] and the current is cut off from the ignition coil 23 at the trailing edge of this signal, namely at the TDC position, after which the present program is ended. Thereafter, and in a similar fashion, ignition timing for each cylinder is controlled by the pseudo-signal T04'.

As stated before, the decoding value Sx is set each time the cylinder discriminating signal T01 is generated. Therefore, even if irregular increment takes place in the ring counter because of noise or the like, the decoding value is set again at the generation of the very next cylinder discrimination signal T01. When this is done, the pseudo-reference position signal T04' can be generated at the correct crank angle position without revising the value of the count Sn in the ring counter.

Although in the foregoing embodiment the ring counter is assumed to be updated automatically since there is no need to stipulate a relation between the count Sn in the ring counter and the crank angle position, it is permissible to adopt an arrangement in which the ring counter is reset whenever the T01 signal is generated to stipulate a relation between the count Sn and the crank angle position.

Thus, according to the method of the invention as described above, loss of the TDC signal as a result of a fault in the reference crank angle position sensing system is dealt with by generating the pseudo-signal of the predetermined pulse width from the cylinder discriminating signal T01 and crank angle position signal T24 and controlling the conduction initiation timing and conduction termination timing of the ignition coil by means of this pseudo-signal. This makes it possible to control ignition timing and to continue operation of the engine even if the TDC signal is lost for the aforementioned reason.

As many apparently widely different embodiments of the present invention can be made without departing from the spirit and scope thereof, it is to be understood that the invention is not limited to the specific embodiments thereof.

What is claimed is:

1. A method of controlling ignition timing of an internal combustion engine when an abnormality develops in a system for sensing a reference crank angle position of a crankshaft of the engine, in which the timing at which an ignition coil starts and stops conducting is controlled on the basis of a first pulse signal generated once per at least two revolutions of the crankshaft at a predetermined crank angle position associated with a particular cylinder of the engine, a second pulse signal indicative of a predetermined reference crank angle position of the crankshaft for each cylinder, and a third pulse signal indicative of predetermined angular positions of the crankshaft, the method comprising the steps of:

sensing an abnormality in the reference crank angle position sensing system for sensing said predetermined reference crank angle position;

generating a pseudo-signal pulse having a predetermined pulse width in place of said second pulse signal on the basis of said first and third pulse signals when said second pulse signal fails to be generated because of the abnormality in said reference crank angle position sensing system;

starting conduction of said ignition coil at a leading edge of said pseudo-signal pulse; and stopping conduction of said ignition coil at a trailing edge of said pseudo-signal pulse.

2. The method as claimed in claim 1, further comprising the steps of:

counting said third pulse signal by a ring counter;

setting a predetermined decoding value whenever said first pulse signal is generated; and generating said pseudo-signal when a count recorded by said ring counter comes into agreement with the set decoding value.

* * * * *